United States Patent
Kurtz et al.

[15] 3,654,579

[45] Apr. 4, 1972

[54] ELECTROMECHANICAL TRANSDUCERS AND HOUSINGS

[72] Inventors: Anthony D. Kurtz, Englewood, N.J.; Joseph Mallon, Philadelphia, Pa.; Charles Gravel, River Edge, N.J.

[73] Assignee: Kulite Semiconductor Products, Inc.

[22] Filed: May 11, 1970

[21] Appl. No.: 36,169

[52] U.S. Cl. ....................338/2, 324/65, 338/5, 338/6, 73/88.5

[51] Int. Cl. ....................G01b 7/20

[58] Field of Search ....................324/65, 59, 65 CP; 338/2, 4, 338/5, 6; 73/88.5

[56] References Cited

UNITED STATES PATENTS

| | | | |
|---|---|---|---|
| 3,513,430 | 5/1970 | Heller | 338/2 X |
| 3,071,745 | 1/1963 | Stedman | 338/2 |
| 3,241,375 | 3/1966 | Canzoneri | 338/5 X |
| 2,784,593 | 3/1957 | Peucker | 338/4 X |

*Primary Examiner*—Herman Karl Saalbach
*Assistant Examiner*—Saxfield Chatron, Jr.
*Attorney*—Arthur L. Plevy

[57] ABSTRACT

There is disclosed an electromechanical transducer of the type employing a silicon diaphragm. The transducer has terminal or contact areas deposited thereon by suitable metallization techniques. The contacts are located on a non-active area of the transducer and are routed by metallized conductors to piezo-resistive sensing elements diffused in the diaphragm within the active region thereof. The diaphragms are associated with suitable housing configurations employing slots or apertures in predetermined locations for accommodating wires or leads which are coupled to the contact areas on the non-active area of the transducer, and are routed through the apertures to afford mechanical isolation of the leads to prevent them from adversely effecting the operating specifications of such transducers.

11 Claims, 8 Drawing Figures

INVENTORS
CHARLES GRAVEL
ANTHONY D. KURTZ &
JOSEPH MALLON

INVENTORS
CHARLES GRAVEL
ANTHONY D. KURTZ &
JOSEPH MALLON

ELECTROMECHANICAL TRANSDUCERS AND HOUSINGS

This invention relates to electromechanical transducers and more particularly to such transducers employing piezo-resistive semiconductors in combination with housing configurations.

The use of the piezo-resistive effect in semiconductors has resulted in the construction of electromechanical force transducers with superior output characteristics and operating frequencies as compared to those transducers previously used for the same purposes.

Basically, the prior art is replete with many different types of piezo-resistive transducers utilized as strain gauges, pressure sensors and for other applications as well. There has been a great deal of research involved in increasing the efficiency of such piezo-resistive sensors. Presently, a great number of such devices are manufactured by using monolithic integrated circuit techniques. Employing such techniques, a resistance bridge or other arrangement comprising piezo-resistive elements is directly formed on a silicon or other type semiconductor material diaphragm to sense force or pressure. The techniques utilized in the fabrication of such sensors are similar to those used, in general, in the fabrication of integrated circuits, such as diffusion technology, epitaxial technology and thermalelectric sealing techniques. Essentially, such sub-miniaturization processes result in improvements in certain characteristics of the pressure transducers. Certain prior art devices, which also use monolithic techniques, include on the silicon diaphragm a plurality of piezo-resistive semiconductor devices in a Wheatstone bridge configuration. The diaphragm or disk is fabricated from a relatively thin sheet of pure silicon and is subjected to a force or pressure to be measured. In order to perform such measurements, the requisite leads from the sensors located on the diaphragm had to be brought out to a suitable terminal arrangement for coupling them to a current measuring device such as an ammeter or some other current or voltage sensing instrument. The operator or user thereby obtained a current or voltage reading which was proportional to the applied force or pressure. These diaphragms, as constructed, generally have circular top faces and look much like a "coin" in appearance. The outer edge or periphery of the disk including certain portions of the top surface are non-responsive to the applied forces, in that such forces do not serve to appreciably deflect this portion of the diaphragm. Hence areas of the diaphragm are usually defined in terms of an active area which contains the piezo-resistive sensors and the non-active area about the periphery of the membrane. The non-active area may include a ridge-like structure, or a rim, for mounting the membrane onto a convenient housing. In such prior art devices, leads were attached to the appropriate terminals of the sensors and were directed to a terminal assembly. The leads as attached were suspended between the active portion of the diaphragm, or those appropriate contacts located on the active portion of the diaphragm, and the terminal assembly. The placement of these leads in this manner caused such transducers to exhibit characteristics which resulted in poorer specifications for the diaphragms than could theoretically be obtained due to the utilization of the integrated circuit techniques.

It is therefore an object of the present invention to provide an improved electromechanical force transducer utilizing piezo-resistive elements with lead and contact arrangements for improved operation.

A further object is to provide electromechanical force transducers fabricated from integrated circuit techniques having contacts associated with the sensors and which contacts are located on the non-active region of the transducer diaphragm.

Still another object is to provide improved transducer assemblies mounted with improved housing configurations for increasing the operating specifications of such transducers.

In accordance with a preferred embodiment of the present invention an electromechanical transducer is shown of the type employing a semiconductor diaphragm having a given cross-sectional surface configuration and having disposed on a surface thereof a plurality of piezo-resistive elements each of which exhibits an impedance variation proportional to the deflections of said diaphragm upon application of a force thereto. The elements are located in proximity with a central portion of the diaphragm defining an active region which is surrounded by another portion of the diaphragm defining a non-active region, wherein the non-active region is not particularly influenced by the application of a force. The terminals of the resistive configuration are disposed on the diaphragm by a metallization technique within the non-active area of the diaphragm. The diaphragm is coupled to the top opening of a cylindrical housing member having a plurality of wire accommodating apertures located on a side surface thereof for directing leads which are connected to said terminals and routed through the apertures in said housing to be further connected to a suitable measuring device.

The transducer with the contact areas located on the non-active region, in combination with the housing provides mechanical isolation of the wires from the diaphragm to thereby permit improved operating specifications for the diaphragm over such prior art arrangements.

These and other objects of the present invention will become clearer if reference is made to the foregoing specification when read in conjunction with the accompanying figures in which.

Figures 1, 2, 3, 4, 5:
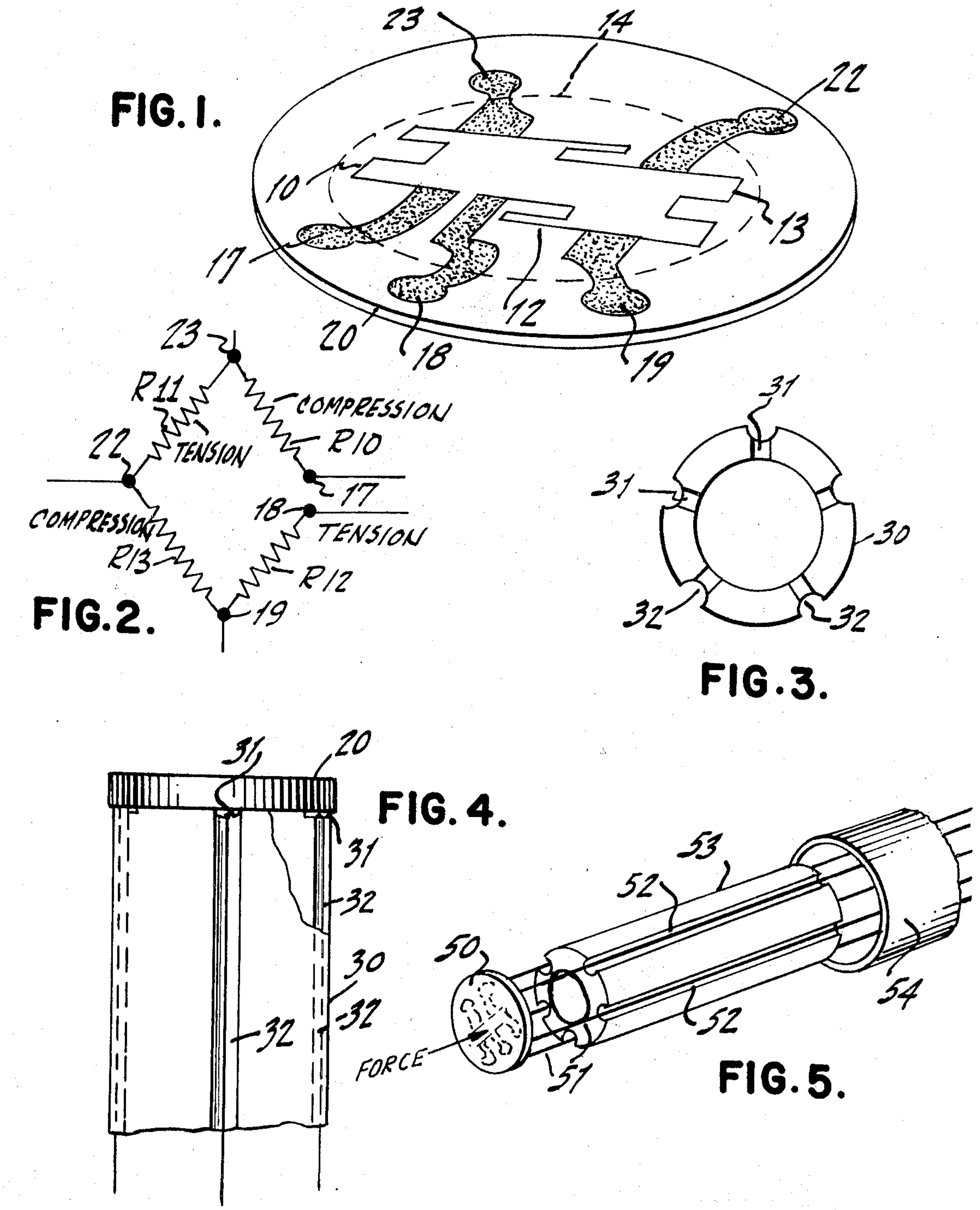
FIG. 1 is a plan view of a piezo-resistive semi-conductor diaphragm having contact configurations according to this invention.
FIG. 2 is a circuit schematic of the resistive configuration shown in FIG. 1.
FIG. 3 is a partial side view of a transducer mounted to a housing configuration according to this invention.
FIG. 4 is a top view of the housing shown in FIG. 3.
FIG. 5 is an exploded plan view of a complete transducer assembly incorporating the features of this invention.

Referring to FIG. 1, there is shown an integral silicon diaphragm 20 containing a four active arm Wheatstone bridge which may be utilized as an electromechanical transducer to provide an output proportional to force or pressure as related to diaphragm deflection. Basically, the diaphragm comprises a thin disk of mono-crystalline silicon onto which the piezo-resistive bridge elements 10, 11, 12 and 13 having been atomically bonded using conventional semiconductor techniques such as solid state diffusion techniques or epitaxial growth techniques. The configuration as shown is primarily determined by using oxide mask and other photo-lithographic processes. Each of the stress sensors 10, 11, 12 and 13 are isolated from the silicon substrate by the presence of a P-N junction and are arranged on the surface of the silicon membrane 20 so that under the influence of a suitable force two of the elements are in tension and two are in compression. The overall diameter of typical diaphragms may vary anywhere up to an inch, and can vary in thickness between 0.001 and 0.040 inches. The thickness of the diaphragm 20 serves to determine the rated load and output. The diaphragm 20 may be mounted on a suitable housing by coupling means in cooperation with the outside rim or the non-active area of the diaphragm and the housing, and as will be explained subsequently.

Shown as a dashed line enclosing the piezo-resistive elements 10 through 13 is an area 14. This area is designated as the active area and is that area which contains the sensing elements 10–13 and is also the area which is primarily affected by the application of a force to the diaphragm 20.

The four piezo-resistive elements 10–13 are arranged on the surface of the silicon membrane 20 to take primary advantage of the forces applied thereto in relation to the semiconductor crystallographic axes. Briefly, it is known that in the design of such integral diaphragms cognizance must be taken of both the longitudinal and transverse piezo-resistive coefficients if optimum characteristics are to result. At the center of the diaphragm both the radial and tangential stresses are equal in magnitude and sign while towards the periphery they are not of the same magnitude but are of the same sign. The stress sensors 10–13 are placed on the diaphragm so that under load, two elements are put in tension and two in compression.

If reference is made to FIG. 2, there is shown the schematic equivalent circuit of the sensors shown in FIG. 1. The various leads shown in FIG. 2 emanating from the piezo-resistive elements are brought out to contact lead areas 17, 18, 19, 22 and 23. As can be seen from FIGS. 1 and 2, these are the contacts necessary to obtain full operation of the Wheatstone bridge sensor configuration to measure forces applied to the diaphragm 20 in terms of changes in the resistance of the piezo-resistive elements 10–13 deposited thereon. The contact areas 17, 18, 19, 22 and 23 are all placed outside the dashed line and are included on the non-active area of the diaphragm 20 or that area which is least affected by a force applied to the diaphragm.

The basic methods of fabricating the leads and contacts are by metallization techniques. Such methods may employ aluminum evaporation techniques whereby aluminum is evaporated over the entire surface of the membrane after the piezo-resistive elements have been diffused therein. Thereafter, in accordance with a suitable mask, the aluminum is preferentially removed leaving the shown pattern of contacts and leads. Another method involves simultaneous electroless plating of a gold-nickel thin film. Oxide is removed preferentially as above and plating occurs only on the bare silicon.

In any event, independent of the metallization process used, the placement of the contacts are on the non-active region of the diaphragm assembly. It is to these contacts 17, 18, 19, 22 and 23 that leads will be soldered or attached by other techniques and brought out to a suitable terminal assembly for coupling to a suitable measuring instrument. It is the connection of the leads to these terminals which has resulted in creating problems in prior art devices as indicated above. Such leads coupled to the terminal areas 17 and 18, for example, act as lossy springs which serve to damp and load the diaphragm resulting in a decrease in the natural frequency of resonance; and further serving to affect other characteristics of the transducer as will be explained subsequently.

Referring to FIG. 3, there is shown a transducer housing 30 which is circular in cross-section as can be further seen by reference to the top view thereof shown in FIG. 4. Basically, the housing is a longitudinal cylindrical member disposed about a given axis and having an open top and bottom surface. The transducer 20 is mounted to the housing as shown in the figure by means of a suitable epoxy or glue which serves to bind the silicon diaphragm 20 to the periphery of the housing 30 at the top surface thereof or other means. The transducer 20 as mounted has the surface containing the piezo-resistive elements faced down. The binding of the transducer 20 to the periphery of the housing 30 is made completely within the non-active area of the transducer. Adjacent to each contact 17, 18, 19, 22 and 23 of FIG. 1 is a passage way 31 on the top surface of the housing which further co-acts with a wire accommodating slot 32 as shown in FIGS. 3 and 4. The slots 32 are in parallel to the major axes of the cylindrical member or housing 30 and are positioned with respect to the silicon membrane 20 so that a wire bonded to one of the above-mentioned contacts is brought through the top passage way or aperture 31 and located within the slot 32. The attached lead or wire is then directed towards the bottom opening of the transducer housing for connection therewith to a suitable terminal socket, or to be coupled to a suitable measuring instrument such as an ammeter. In this manner, each wire is no longer suspended from the bottom or piezo-resistive surface of the membrane 20 and is mechanically isolated therefrom by means of the support afforded by the slot 32 with the associated passage ways 31. Due to the fact that the contacts are now located on the non-active surface of the transducer, and that the wires are also located on the non-active surface of the transducer, and are further mechanically isolated by means of the appropriate slots 32 and apertures 31, the wires will not act to damp or substantially affect the natural frequency or to otherwise alter the specifications of the transducer to the extent that they did so in the prior art.

The housing 30 may be fabricated from a ceramic material such as a hard plastic type organic material. Since such a material is a very good insulator if such a material is utilized, there is no necessity for using insulated wires as there is no chance of the wires shorting one another as they could do in prior art devices. This feature is afforded because of the confinement of the wires within the appropriate slots 32. The use of non-insulated wire serves great advantage in enabling one to solder such wire to terminals and to work with such wire in general.

However, the housing 30 may also be fabricated from a metallic material such as an invar or stainless steel compound. If this is the case, than one can again utilize uninsulated wire by merely coating the slots 32 with an appropriate insulating material such as a varnish or a plastic-like finishing compound. Therefore, the housing configuration not only serves to mechanically isolate the wires from influencing the operation of the diaphragm, but also enables one to use bare wire in lieu of insulated types.

At this point a brief description of the advantages afforded by the above described apparatus is felt to be pertinent.

In prior art devices, the terminal or land contact areas were disposed within the active area or pressure responsive area of the diaphragm or membrane 20 and leads were attached thereto. The piezo-resistive elements as diffused are placed on the same surface as the terminals and the force is applied to the opposite surface. Hence, the leads were "hung" or suspended from the same surface and were thence coupled directly to an indicating means as an ammeter or to a terminal assembly.

Because of the suspension of the leads, they had to be insulated as they might contact one another or short to a metal housing which supported the transducer when the transducer was deflected. Furthermore, even though the utilization of semi-conductor integrated circuit techniques improved the overall transducer specifications, the lead arrangement and configuration prevented the full and optimum use of such improvements in regard to certain specifications.

Furthermore, the fact that the leads and the terminals associated therewith were placed on the active region of the membrane resulted in still more specification difficulty.

For example, it is desirable to manufacture such transducers with high natural frequencies of operation, in order to enable the measurement of high frequency force phenomenon. It has been found that by placing the terminals and leads in the non-active or non-pressure sensitive area of the diaphragm the natural frequency of resonance increases. The leads as used in the prior art tended to damp the diaphragm and acted as lossy spring members or as additional loads, thereby lowering the natural frequency and further tending to fracture the diaphragm when acted on by a force of a frequency close to the natural frequency because of uneven weight and force distributions.

The positioning of such leads and terminals in the non-active area also served to decrease hysterisis. Hysterisis being the ability of the disk or diaphragm to return to its original position after being subjected to a deflecting force. Due to the fact that such leads and terminal arrangements act as lossy springs and so on, they provided additional forces and caused offset which resulted in poor hysterisis response. The positioning of the contacts on the non-active area of the diaphragm together with the routing of the leads through the apertures in the housing enable the transducer assemblies of the invention to operate with a 5 to 20 times decrease in hysterisis.

Furthermore, because of the elimination of the damping loads produced by prior art terminal and wiring arrangements, these improved transducers track and make calibration easy. What is meant by this is that the manufacturer would desire to calibrate the piezo-resistive elements and therefore the transducer assembly by applying direct current components thereto and specifying the alternating current response. However, in prior art devices there would be lack of tracking due to the "creep effect". The long-term effect of temperature is manifest in a phenomenon known as creep. If a tensile or other specimen is subjected to a force or load at a raised temperature, it will continue to elongate until a rupture occurs. In general, the higher the temperature, the higher the rate of creep. Likewise, the rate of creep depends upon the applied stress or forces as well. Creep exists in silicon and in the leads attached thereto and hence, the elongation of the leads at elevated temperatures resulted in stresses and disruptions applied as extraneous loads on the transducer and therefore affected its operating characteristics and their repeatability. Due to the utilization of the above described configurations, the creep effect has substantially been eliminated.

Referring to FIG. 5, there is shown an exploded isometric view of a complete housing configuration according to this invention. An integral silicon diaphragm 50 having a suitable piezo-resistive configuration disposed on the bottom surface thereof according to FIG. 1, has wires 51 coupled to the appropriate terminal areas (as 17, 18, etc. of FIG. 1) which are routed via the slots 52 in the sides of the cylindrical housing 53. The transducer 50 is positioned over the top opening of the housing 53 so that the active region containing the piezo-resistive elements will easily deflect upon the application of a suitable force or pressure thereto. Such force or pressure causes the resistors to change value in accordance with the deflection of the membrand and hence provide a resistance which is proportional to the magnitude of the applied force. After the transducer 50 is so fastened by epoxy or otherwise and coupled to the housing 53, the wires are properly routed through the slots, and a brass sleeve as 54 is then placed over the housing 53 and fastened thereto by means of a suitable glue or epoxy compound, thus forming an integral housing and transducer assembly. The wires 51 are routed through the bottom opening and may be coupled to an appropriate voltage or current indicating source as well as a bias supply to operate the resistive configuration in a suitable detection circuit.

Figure 6:
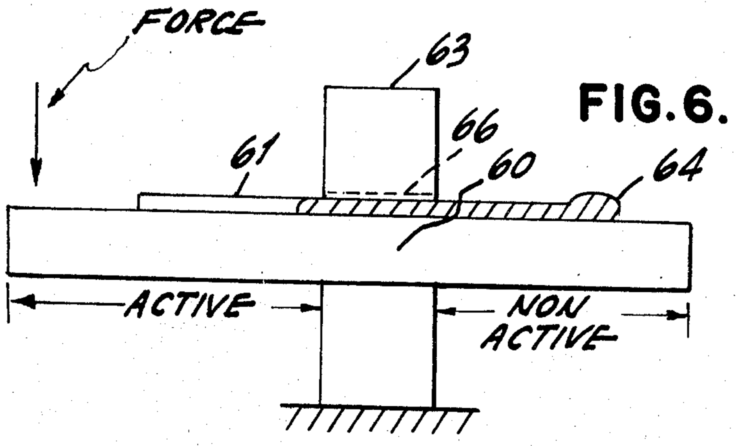
FIG. 6 is a side view of a cantilever transducer assembly employing a contact arrangement according to the teachings of this invention.
Figure 7:
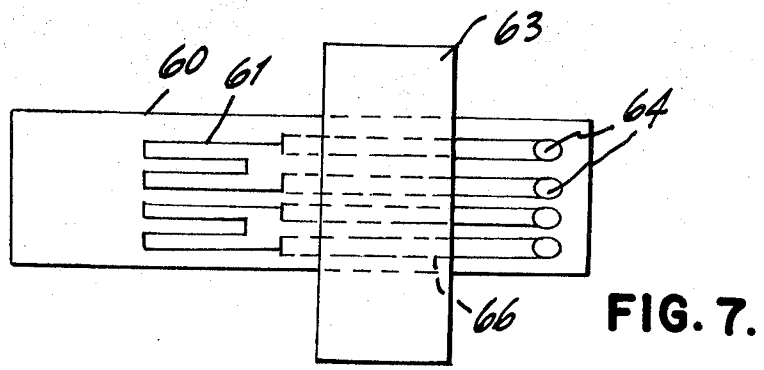
FIG. 7 is a top view of the cantilever assembly shown in FIG. 6.

Referring to FIGS. 6 and 7, there is shown a side and top view of a cantilever transducer assembly which employs contact terminals located on the non-active area of the cantilever configuration. A rod or beam of silicon or other material 60 has disposed thereon a piezo-resistive element 61. The terminals of the resistor 61 are metallized and can be brought through apertures or slots in a support fixture 63 to land or contact areas 64 located on the non-active region of the cantilever assembly. The cantilever transducer as shown in FIGS. 6 and 7 is supported at one end thereof by the support member 63 which may be coupled to a suitable housing or a ground reference plane and is stationary for the application of a suitable force as shown in FIG. 6 to the other end or active area of the cantilever. The active area which has the piezo-resistive element 61 located thereon deflects upon application of a force thereto similar to that active area shown for the silicon diaphragm member for FIG. 1. Such prior art cantilever assemblies had the contacts and the wires emanating therefrom located on the same active surface which incorporated the piezo-resistive elements. Therefore, the wires suspended from these points were also effective in reducing the transducer specifications as mentioned above. In the manner of the invention described, the cantilever configuration shown in FIGS. 6 and 7 has slots or apertures drilled or formed through the member 63 which permit metallization therethrough to form conductive paths to the appropriate terminals of the piezo-resistive material. These paths connect the piezo-resistor 61 to the terminal or contact area 64 located on the non-active surface of the transducer. Hence wires, as previously described, can be soldered or otherwise coupled to those terminal areas 64 and brought out to suitable measuring equipment without affecting any of the operating specifications described above because of undue loading or mechanical coupling of such leads. It is also known that resistors can be placed on the bottom of the cantilever member shown, which resistors measure compression as the resistor 61 on the top surface measures tension.

Figure 8:
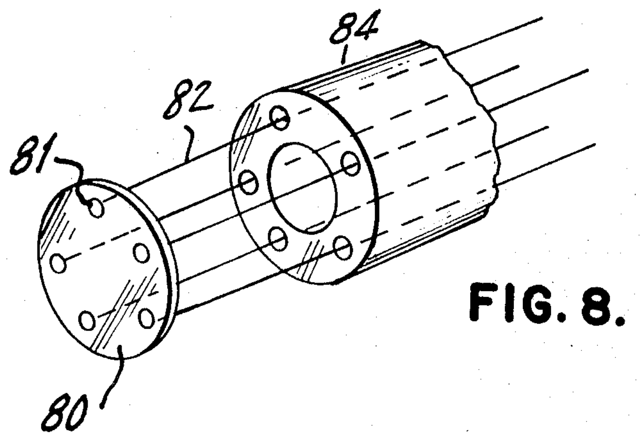
FIG. 8 is a partial plan view of a transducer diaphragm and a housing having apertures according to another embodiment of the present invention.

Referring to FIG. 8, there is shown still another configuration employing an integral silicon diaphragm 80 having a suitable piezo-resistive configuration disposed on a bottom surface thereof with appropriate terminals 81 located on the same surface as the piezo-resistive elements. Wires 82 are coupled thereto and are directed through holes in the side walls of the housing 84. The housing 84 is fabricated from a similar material as described in conjunction with the housings of FIGS. 3 and 4. The configuration shown in FIG. 8 serves to mechanically isolate the wires from the transducer assembly, thereby obtaining the same advantages as previously described in conjunction with the alternate configurations shown above.

While the foregoing description and specification sets forth the principles of the invention in connection with specific apparatus, it is to be understood that the description is made only by way of example and not as a limitation of the scope of the invention as set forth in the accompanying claims.

What is claimed is:

1. An electromechanical transducer for responding to the magnitude of an applied force comprising,
   a. a relatively thin diaphragm of a given cross-section, and having a predetermined active area which deflects upon the application of said force thereto, and a non-active area substantially uneffected by said force,
   b. force responsive element mounted on said diaphragm in said active area, and having first and second terminals,
   c. a longitudinal tubular member disposed about an axis, and having open top and bottom ends, said member having a central aperture relatively congruent with said predetermined active area of said diaphragm and having on a surface thereof at least one slot approximately parallel to said axis,
   d. means for mounting said diaphragm at said non-active area over said open top end of said tubular member, and
   e. at least one conductor coupled to one of said terminals of said force responsive element and directed towards said bottom open end of said member within said at least one slot.

2. The transducer according to claim 1 wherein said longitudinal tubular member is fabricated from a ceramic insulator material.

3. The transducer according to claim 1 wherein said longitudinal tubular member is fabricated from a conductive metallic material and said slot is insulated.

4. An electromechanical transducer of the type employing a semiconductor diaphragm having a given cross sectional surface configuration and having deposited on a surface thereof a plurality of piezo-resistive elements, each of which exhibits an impedance variation proportional to the deflection of said diaphragm, said elements being located in proximity with a central portion of said diaphragm defining an active region and surrounded by another portion of said diaphragm defining a non-active region, wherein said active region is that portion of said diaphragm which deflects most readily upon the application of a force to said diaphragm, the improvement therewith comprising,
   a. a plurality of terminals deposited on said diaphragm within said non-active region and located on said surface,
   b. means coupling each of said piezo-resistive elements to different selected ones of said terminals on said non-active area, c. an annular housing means coupled to said non-active area of said diaphragm for supporting the same thereat, said housing having a central aperture approximately congruent with said central portion of said diaphragm, said central aperture of said housing surrounding said active area of said diaphragm to thereby permit said active area to readily deflect upon application of said force thereto, said housing means including wire accommodating apertures on a surface thereof, d. leads coupled to said terminals on said non-active area and directed from said housing, said leads being located within said wire accommodating apertures on said surface of said housing.

5. An electromechanical transducer of the type employing a silicon diaphragm having a given cross sectional surface configuration and having deposited on a surface thereof a plurality of piezo-resistive elements, each of which exhibits an impedance variation proportional to the deflection of said diaphragm, said elements being located in proximity with a central portion of said diaphragm defining an active region and surrounded by another portion of said diaphragm defining a non-active region, wherein said active region is that portion of the diaphragm which deflects most readily upon the application of a force to said diaphragm, the improvement therewith comprising, a. plurality of terminals located on said surface of said diaphragm and within said non-active region thereof, b. plurality of conductive paths positioned on said surface coupling each of said elements with a preselected one of said terminals, c. a longitudinal cylindrical member disposed about a given axis and having open top and bottom ends, said housing having a plurality of conductor accommodating apertures located on a side surface, d. means for coupling said diaphragm to said cylindrical member at said non-active region over said top end of said member, and e. a plurality of conductors each one separately located in one of said apertures and connected to a separate one of said terminals and directed from said terminals to said bottom opening of said cylindrical member.

6. The electromechanical transducer according to claim 5 wherein, said longitudinal cylindrical member is fabricated from an insulating type material.

7. The transducer according to claim 5 wherein, said plurality of conductive paths positioned on said surface are metallized paths deposited thereon by an aluminum evaporation process.

8. The transducer according to claim 5 wherein, said plurality of conductive paths positioned on said surface are thin film gold-nickel conductors.

9. An electromechanical transducer assembly for measuring the intensity of a force applied thereto comprising, a. a relatively thin member having a predetermined active portion for deflecting upon application of said force thereto, and a predetermined non-active portion which is substantially unaffected by said force, b. support means coupled to said non-active portion of said thin member for supporting said member with said active portion positioned for easy deflection upon application of said force, said support means having at least one continuous conductor accommodating aperture directed from a first end of said support means to a second end, c. at least one force responsive element located on said active portion of said thin member, d. a terminal located on said non-active portion of said diaphragm, e. a first conductor coupling said force responsive element to said terminal, and f. a second conductor coupled to said terminal and directed away from said element, said second conductor being located within said conductor accommodating aperture.

10. The transducer assembly according to claim 13 wherein, said relatively thin member is a disk-like thin diaphragm, having a central portion defining said active area and a peripheral portion defining said non-active area.

11. The transducer assembly according to claim 10 wherein said support means comprises, an annular housing having a central aperture relatively congruent with said central portion of said disk-like diaphragm and having said at least one conductor accommodating aperture in a side surface thereof, said annular housing being coupled to said disk at the peripheral portion thereof to position said active area of said disk in congruency with said central aperture of said annular housing.

* * * * *

UNITED STATES PATENT OFFICE

CERTIFICATE OF CORRECTION

Patent No. 3,654,579 Dated April 4, 1972

Inventor(s) Anthony D. Kurtz, et al.

It is certified that error appears in the above-identified patent and that said Letters Patent are hereby corrected as shown below:

Column 8, line 30 "according to claim 10" should read -- according to claim 9 --.

Signed and sealed this 21st day of November 1972.

(SEAL)
Attest:

EDWARD M.FLETCHER,JR.
Attesting Officer

ROBERT GOTTSCHALK
Commissioner of Patents